Dec. 18, 1934.  C. F. WIEBUSCH  1,985,005

VIBRATION TRANSLATING DEVICE

Filed Oct. 4, 1933

INVENTOR
C. F. WIEBUSCH
BY
*G. M. Campbell*
ATTORNEY

Patented Dec. 18, 1934

1,985,005

UNITED STATES PATENT OFFICE 1,985,005

VIBRATION TRANSLATING DEVICE

Charles F. Wiebusch, New York, N. Y., assignor to Bell Telephone Laboratories, Incorporated, New York, N. Y., a corporation of New York Application October 4, 1933, Serial No. 692,058

6 Claims. (Cl. 179—100.41)

This invention relates to vibratory translating devices and more particularly to moving coil recorders for making phonograph records.

The object of the invention is a recorder of this type which is capable of uniform and substantially distortionless response over a wide range of frequencies.

In accordance with the general features of the invention a light weight moving system, consisting of a coil disposed in a suitable magnetic circuit and a stylus driven by the coil, is supported by spaced parallel diaphragms enclosing an oil filled chamber containing an annular damping plate. The plate is recessed on either side or it may be tapered toward the center to provide space for the oil which is moved from one side of the plate to the other as the diaphragms vibrate. The coil is mounted externally of the chamber so that the heat generated in it by the signal currents does not materialy affect the viscosity of the oil.

In one embodiment of the invention the annular pole piece surrounding the coil serves also as the damping plate, the upper diaphragm being bent downwardly in the gap to form the damping chamber and provide a recess for the coil. In an alternate construction the coil is connected to the stylus by a tubular member, the supporting diaphragms and the enclosed damping plate are beneath the coil and entirely independent of the magnetic circuit. In either type of structure the damping can be increased to any desired extent by using two or more damping plates and the necessary additional diaphragms.

Figure 1:
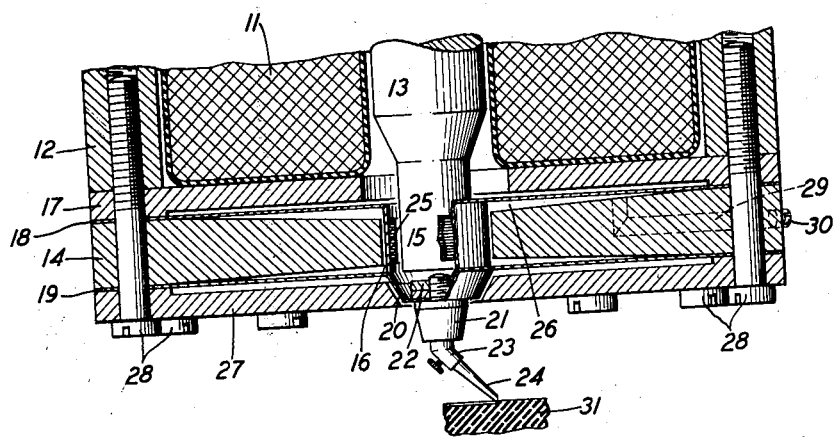
Figure 2:
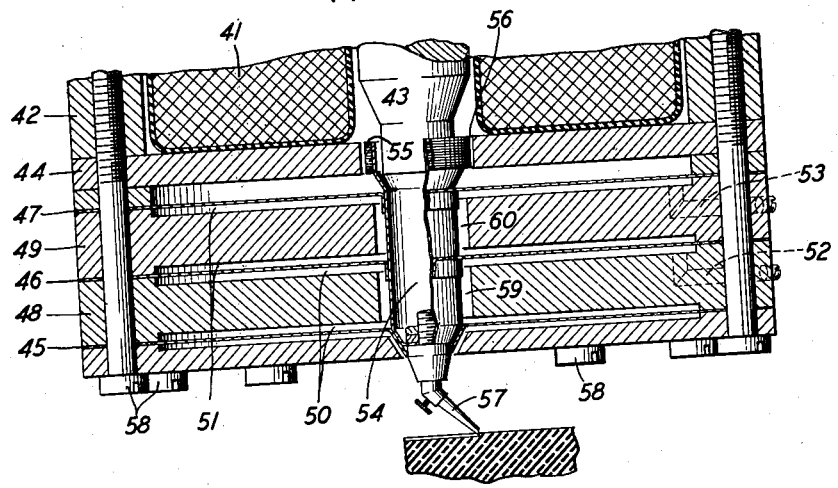

In the drawing Fig. 1 shows a recorder in which a portion of the magnetic circuit serves as the damping plate and Fig. 2 shows a recorder with two damping plates both independent of the magnetic circuit.

Referring to the structure of Fig. 1, the coil 11 produces a steady flux in the magnetic circuit which includes the casing 12, the central pole piece 13 attached to the casing and the combination damping plate and pole piece 14 which with the reduced end portion 15 of the central pole piece, defines the air-gap 16. The coil 11 is supported in the casing by an annular magnetic plate 17, the periphery of which is a part of the magnetic circuit.

The upper diaphragm 18 is bent downwardly in the gap and secured to the lower diaphragm 19 which has a cup-shaped central portion 20 adapted to receive the stylus supporting member 21. This member is secured to the diaphragm by a nut 22 and is fitted at its lower end with an angular shank member 23 which holds the stylus 24 at the proper cutting angle. The coil 25 carrying currents representing the sounds to be recorded is secured to the vertical portion of the diaphragm 18 externally of the damping chamber 26 defined by the diaphragms 18 and 19. The bottom plate 27 for protecting the lower diaphragms from injury, the diaphragms and the plates 14 and 17 are all secured to the casing 12 by bolts 28. The plate 14 is in contact with diaphragms 18 and 19 at their peripheries but is tapered in the direction of the gap 16 to form the damping chamber 26. The plate 14 is provided with an oil hole 29 and a removable plug 30 so that the chamber may be easily filled after assembly.

When the coil 25 is carrying signal currents a vertical vibratory motion is imparted to the diaphragms and the stylus 24 which cuts a corresponding hill and dale groove in the record blank 31. The vibratory motion of the diaphragms causes the oil in the chamber 26 to flow back and forth along the surfaces of the plate 14 from one side to the other through the gap 16. The resistance of the oil to this motion dampens the vibrations and causes the stylus to respond uniformly over the range for which it is designed to operate. While the plate 14 has been shown tapered toward the gap it will be understood from the description of Fig. 2 below that a flat plate uniformly spaced from the diaphragms may be used if desired.

The recorder of Fig. 2 differs from the structure described above in several respects. The magnetic circuit is entirely independent of the damping system, a double damping unit is provided and the damping plates are of uniform thickness instead of being tapered as in Fig. 1.

The coil 41 provides a steady flux for the magnetic circuit which in this case includes the casing 42, the central pole piece 43 and the annular pole piece 44 which also supports the coil 41. The entire structure below the pole piece 44 may be non-magnetic. The three diaphragms 45, 46 and 47 and the two damping plates 48, 49 define two damping chambers 50, 51 each with its own filling hole 52 and 53. All three diaphragms are connected to the central tube 54 supporting the coil 55 in the magnetic gap 56. The stylus 57 is connected to the lower diaphragm 45 in the same manner as in the device already described and the whole assembly of the damping units and the vibratory structure is secured to the casing 42 by bolts 58. The operation of this device is essentially the same as the one described above, but it will be noted that with this construction the design of the damping unit is more flexible. In the device of Fig. 1 the gap 16 must be kept as short as possible to maintain the efficiency of the recorder, thereby limiting the size of the orifice available for transferring the oil from one side of the damping member to the other. In Fig. 2 however the orifices 59, 60 in the damping chambers can be made of any desired size thereby permitting greater choice in the viscosity of the damping medium and the spacing of the diaphragms and damping plates. In some cases depending on the amount of damping required and the particular medium to be used it may be desirable to taper either or both of the plates 48 and 49 like the plate 14 of Fig. 1.

Other modifications within the scope of the following claims will occur to those skilled in the art; for example more than two damping chambers may be used and one of the damping plates of the recorder can be used also as a pole piece as in the recorder of Fig. 1 regardless of the number of damping chambers provided.

What is claimed is:

1. In a vibration translating device, a coil, a stylus connected to the coil, spaced parallel diaphragms supporting the coil and stylus and forming a damping chamber, a stationary damping plate within the chamber and viscous material between the plate and the diaphragms.

2. In a vibration translating device, a central pole piece and an annular pole piece defining a gap, a coil disposed in the gap, a stylus connected to the coil, a pair of spaced diaphragms on opposite sides of the annular piece supporting the coil and viscous material substantially filling the space between the diaphragms.

3. In a vibration translating device, a coil, a stylus, a tubular member connecting the stylus to the coil, spaced parallel supporting diaphragms surrounding the tube beneath the coil, and a damping plate and a viscous damping medium between the diaphragms.

4. In a vibration translating device, a coil, a stylus connected to the coil, spaced parallel diaphragms supporting the coil and stylus, stationary damping plates between the diaphragms and viscous material between the plates and the diaphragms.

5. In a phonograph recorder the combination with a cutting stylus, spaced parallel diaphragms supporting the stylus and enclosing a damping chamber, a fixed damping plate and a viscous medium between the diaphragms, of means for driving the stylus including a coil carrying signal currents secured to the diaphragms externally of the damping chamber.

6. In a phonograph recorder, a magnetic circuit including a gap, a coil mounted in the gap, a cutting stylus, a tubular member connecting the stylus to the coil, a damping plate surrounding the tubular member and a diaphragm disposed on each side of the member for defining a damping chamber and supporting the member, and a damping medium in the chamber adapted to be displaced radially of the plate by the vibration of the diaphragms.

CHARLES F. WIEBUSCH.